Dec. 28, 1926.
W. M. CROSS
FURNACE CONSTRUCTION
Filed June 8, 1925    2 Sheets-Sheet 2
1,612,266
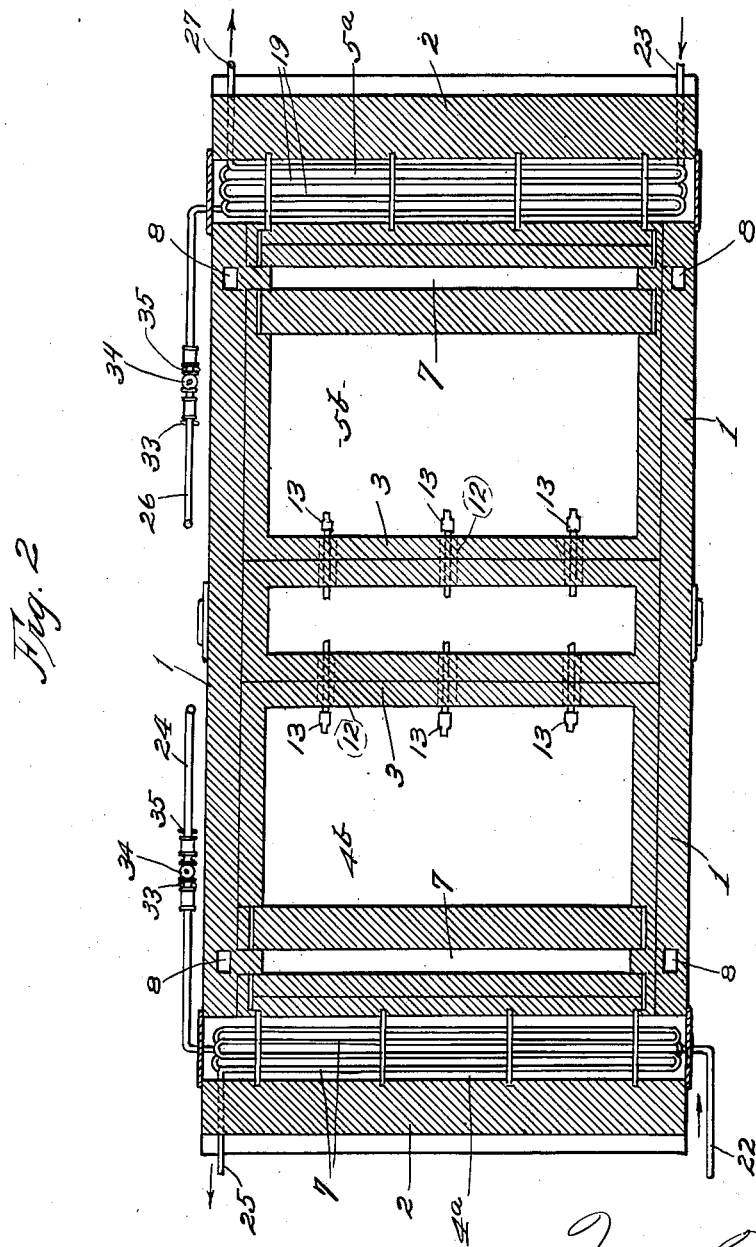
Witness:
R. E. Hamilton
INVENTOR.
Walter M. Cross
BY Thomas E. Sofield
ATTORNEY.

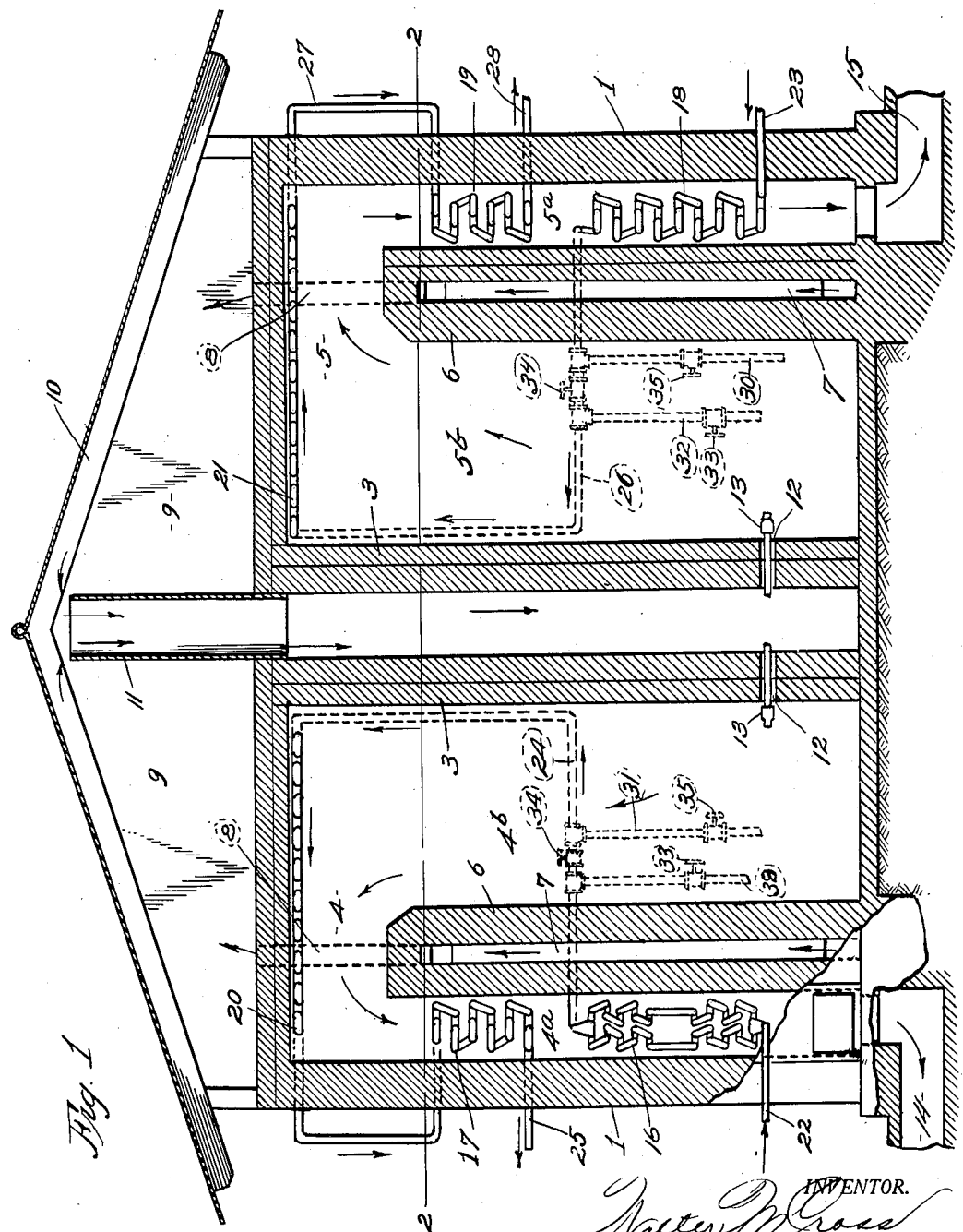

Patented Dec. 28, 1926.

1,612,266

UNITED STATES PATENT OFFICE.

WALTER M. CROSS, OF KANSAS CITY, MISSOURI, ASSIGNOR TO GASOLINE PRODUCTS COMPANY, INC., OF NEW YORK, N. Y., A CORPORATION OF NEW YORK.

FURNACE CONSTRUCTION.

Application filed June 8, 1925. Serial No. 35,585.

This invention relates to improvements in furnace construction, and refers more particularly to a lay-out in which a double chamber arrangement is positioned beneath an enclosure and constructed as a single unit.

Among the objects of the invention are, to provide a construction in which two furnaces are placed side by side and receive the air for combustion through a single preheated duct or passage and the combustion gases in the separate chambers being directed outwardly from the central inlet duct whereby an increased efficiency is attained due to the utilization of the heat of the separate units; to provide a construction in which fluid medium is circulated through tubes mounted in an advantageous position in order to utilize efficiently the heat of the combustion gases.

Fig. 1 is a sectional side view of the construction.

Fig. 2 is a sectional plan view taken along the line 2—2 in Fig. 1.

Referring to the drawings, the furnace is made up of heavily insulated outside walls 1 and end walls 2. Intermediate and centrally of the end walls are two inner walls 3 which form the separate furnace chambers 4 and 5. Within the furnace chambers are positioned baffle walls 6 which divide the chambers to form tube spaces or tube chambers $4^a$ and $5^a$ and combustion spaces $4^b$ and $5^b$. The baffle walls 6 are hollow as shown at 7, and have communicating ducts with the outside air not shown and passageways 8 shown on dotted lines in Fig. 1 serving as passageways for the air which is introduced from the atmosphere and which is circulated through the hollow spaces in the baffle walls prior to its introduction to the upper space 9 above the furnace and beneath the roof enclosure 10. This circulation of the air through the baffle walls serves a double purpose, namely, it preheats the incoming air and further prevents deterioration or melting down of the baffle walls due to the high temperatures maintained in the separate furnaces. After being preheated by this circulation, the air passes into the upper open end of the standpipe 11, flowing downwardly between the adjoining walls 3 of the separate furnaces where it is further heated due to the high radiating temperatures. Near the bottom of each furnace the air is introduced around the burners through the apertures shown diagrammatically and designated as 12. The burners 13 are supplied with oil and steam through separate connections not shown. The combustion mixture of air and fuel is burned in the combustion spaces $4^b$ and $5^b$— the gases passing over the baffle walls in the directions shown by the arrows and downwardly through the tube chambers or tube spaces $4^a$ and $5^a$, passing off or discharging from the tube spaces through flues 14 and 15, which are connected to the tube chambers $4^a$ and $5^a$, respectively. These flues may communicate with separate chimneys or may be combined in a single flue and passed to a common stack. In the tube spaces $4^a$ and $5^a$ are positioned banks of tubes 16 and 17, and 18 and 19. In the top of the chambers 4 and 5 are positioned single tiers or rows of tubes 20 and 21. These tubes are what are termed "radiant tubes," as they are positioned against a reflecting surface and receive the radiant heat from the separate combustion chambers. They function not only to effect a very rapid heat exchange from the combustion gases to the medium flowing therethrough, but also serve to carry off very rapidly the heat of the combustion chamber, thereby preventing deterioration or failure of the furnace walls which is, in most cases, primarily due to the radiant heat of the combustion chamber.

In heating fluid mediums, the material is charged through either of the inlet lines 22 or 23; in the former case, being circulated through the bank of tubes 16, transfer line 24, radiant tubes 20 and finally through the bank of tubes 17 and out through the transfer line 25; in the opposite furnace, the medium is introduced through the line 23, circulated through the bank of preheating tubes 18 in the tube space $5^a$—corresponding to the tubes 16 in the tube space $4^a$—, thence through the line 26 to the radiant tubes 21 and finally through the transfer line 27 to the tubes 19 and out through the transfer line 28. In each case the travel of the medium is substantially identical. Radiating lines 29 and 30 are connected into the transfer lines 24 and 26, respectively, as also are the steam lines 31 and 32. The circulating lines 29 and 30 have connections not shown with the outlet lines 25 and 28, respectively, or to the discharge from the reaction or vaporizing chambers to which the transfer lines 25 and 28 are connected. The function of the circulating lines is to create a local circulation through the tubes until the medium has been brought up to proper temperature at which time the circulating lines are by-passed and the operation made continuous. The steam lines 31 and 32 are for the purpose of blowing out the tubes in cleaning. The circulating and steam lines are controlled by suitable valves such as those shown at 33, 34 and 35.

Primarily, the furnace is designed for the treatment of hydrocarbon oils in raising the oil to a cracking heat during its circulation through the coils. The furnace is further intended for a process in which one type of oil is circulated through one furnace and a distinctly different type of oil circulated through the adjoining furnace. In any event, the construction provides a lay-out which efficiently utilizes the heat generated in the combustion space eliminates to a great extent the objectionable overheating of the tubes by positioning the same in direct radiating contact with the combustion gases with the exception of the upper radiant tubes which are placed for the specific purposes for rapidly removing the heat of the furnace from the upper radiating surfaces or ceilings of the furnaces.

I claim as my invention:

1. A double furnace construction having an inlet air duct between the adjoining inner walls and separate flues, baffle walls within the combustion spaces of the separate furnaces, air preheating spaces within the baffle walls, firing means directed outwardly from the inner walls whereby the intake air is consumed in the combustion gases passing outwardly over the baffle walls to the flues.

2. A double furnace construction of the character described, comprising two combustion chambers having their inner walls in juxtaposition, an air intake or inlet therebetween and preheated by the walls, said inlet adapted to provide air from above to the separate furnaces, hollow baffle walls within the combustion spaces of the furnaces and ducts for directing the air through the hollow portions of the baffle walls prior to its passage through the air inlet between the furnace walls.

3. A double furnace construction of the character described, comprising two interior chambers having their inner walls adjoining, an air intake or inlet therebetween and preheated by the walls, said inlet adapted to provide air from above to the separate furnaces, hollow baffle walls within the chambers separating the same in combustion and tube spaces, separate banks of tubes in the tube space and a layer of radiant tubes against the upper ceiling reflecting surface of the adjoining chambers and connections whereby a fluid is passed serially in a continuous travel through the tube units.

WALTER M. CROSS.